(12) United States Patent
Pathross

(10) Patent No.: US 11,628,574 B2
(45) Date of Patent: Apr. 18, 2023

(54) SYSTEM AND METHOD FOR ROBOTIC, COMPACT, MOBILE BEVERAGE STATION

(71) Applicant: Ross Digital PTE Ltd., Singapore (SG)

(72) Inventor: Gavin Pathross, Singapore (SG)

(73) Assignee: Ross Digital PTD Ltd., Singapore (SG)

( * ) Notice: Subject to any disclaimer, the term of this patent is extended or adjusted under 35 U.S.C. 154(b) by 985 days.

(21) Appl. No.: 16/434,626

(22) Filed: Jun. 7, 2019

(65) Prior Publication Data
US 2019/0375111 A1 Dec. 12, 2019

Related U.S. Application Data (60) Provisional application No. 62/682,664, filed on Jun. 8, 2018.

(51) Int. Cl.
| | |
|---|---|
| *B25J 11/00* | (2006.01) |
| *G06Q 20/18* | (2012.01) |
| *B25J 13/00* | (2006.01) |
| *B25J 13/06* | (2006.01) |
| *G06Q 50/12* | (2012.01) |

(52) U.S. Cl.
CPC ......... *B25J 11/0045* (2013.01); *B25J 13/006* (2013.01); *B25J 13/06* (2013.01); *G06Q 20/18* (2013.01); *G06Q 50/12* (2013.01)

(58) Field of Classification Search
CPC ...... B25J 11/0045; B25J 13/006; B25J 13/06; G06Q 20/18; G06Q 50/12; G06Q 20/145; G07F 13/025; G07F 13/065; G07F 15/02
See application file for complete search history.

(56) References Cited

U.S. PATENT DOCUMENTS

| | | | |
|---|---|---|---|
| 8,869,463 B2 | 10/2014 | Noiseux et al. | |
| 11,203,486 B2 * | 12/2021 | Lert, Jr. ............... | B65G 1/0435 |
| 2006/0043111 A1 | 3/2006 | Jennings et al. | |
| 2007/0267087 A1 | 11/2007 | Jones et al. | |
| 2016/0052770 A1 | 2/2016 | Ratti | |
| 2017/0221296 A1 | 8/2017 | Jain et al. | |

OTHER PUBLICATIONS

Notification of International Search Report and Written Opinion dated Jan. 16, 2020; PCT Application No. PCT/IB/2019/000657; pp. 1-10.

* cited by examiner

*Primary Examiner* — Ian Jen
(74) *Attorney, Agent, or Firm* — FisherBroyles LLP; Kevin D. Jablonski (57) ABSTRACT

A compact, mobile, robotic beverage station that may be deployed in any location for use. The compact and mobile nature of the beverage station allows the automated robotic beverage station to be deployed at any suitable location both indoors and outdoors. Further, various embodiments are self-contained in that the beverage station includes on-board battery supplied power, on-board liquid disposal (e.g., a holding tank) and on-board water supply. Further, the automated robotic nature of several embodiments provides for beverage selection, preparation and serving without labor costs as the robotic automated aspects can process inputs from communicatively coupled smart phone and the like. The beverage station includes a processor for receiving the beverage order, determining ingredients, controlling robotic components that select, mix and serve the ordered beverage and then handle financial transactions.

18 Claims, 6 Drawing Sheets

SYSTEM AND METHOD FOR ROBOTIC, COMPACT, MOBILE BEVERAGE STATION

PRIORITY CLAIM

This application claims the benefit of U.S. Provisional Application No. 62/682,664, entitled "System and Method for Robotic, Compact, Mobile Beverage Station" filed Jun. 8, 2018, which is incorporated by reference in its entirety herein for all purposes.

BACKGROUND

Robotics and robotic engineering are fields that are growing at a fast pace. Several tasks that humans have performed in the past can be accomplished by specialized robots with increasing precision and speed. One such area in which robotics is making headway is beverage dispensing. Robotics are appearing behind bars and in coffee shops and are poised to revolutionize the industry. Further, the statistics surrounding restaurants starts and operations remain bleak with about 60% of new restaurants failing within the first year and nearly 80% shuttering before the fifth anniversary. Automated services may stem the tide of failures.

However, deployment and retrofit obstacles remain as currently existing beverage stations are optimized for human operation. Further, time and capital investment for many restaurants remains significant as an age-old question of location, location, location is still prevalent. As such, acquiring space to build automated systems can be difficult to come by. That is, conventional automated and/or robotic serving station are bulky and expensive, and typically require utility connections to power, sewer, and water, thereby making them non-mobile and non-versatile.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to a compact, mobile, robotic beverage station that may be deployed in any location for use. As alluded to above, automated, robotic serving station can often require a multitude of external utilities for use and operation including water supply, sewer, electrical, and the like. Embodiments of the beverage station as discussed herein are compact, mobile and self-contained. As such, the compact and mobile nature allows the automated robotic beverage station to be deployed at any suitable location both indoors and outdoors. Further, various embodiments are self-contained in that the beverage station includes on-board battery supplied power, on-board liquid disposal (e.g., a holding tank) and on-board water supply.

Further, the automated robotic nature of several embodiments provides for beverage selection, preparation and serving without labor costs as the robotic automated aspects can process inputs from communicatively coupled smart phone and the like. Thus, a patron may utilize a personal smart phone or an on-board interface for ordering a drink. The beverage station includes a processor for receiving the beverage order, determining ingredients, controlling robotic components that select, mix and serve the ordered beverage and then handle financial transactions. With the mobile automated and compact nature of the beverage station, one may deploy in many areas during high peak time without sunk costs of retrofit or utility connections. Further, the walls of the beverage container may be deployed to become a platform surrounding the beverage station having seating and table tops as well as be able to form a canopy over the beverage station and surrounding area. These and other aspects are discussed further below with respect to FIGS. 1-10.

Figure 1:
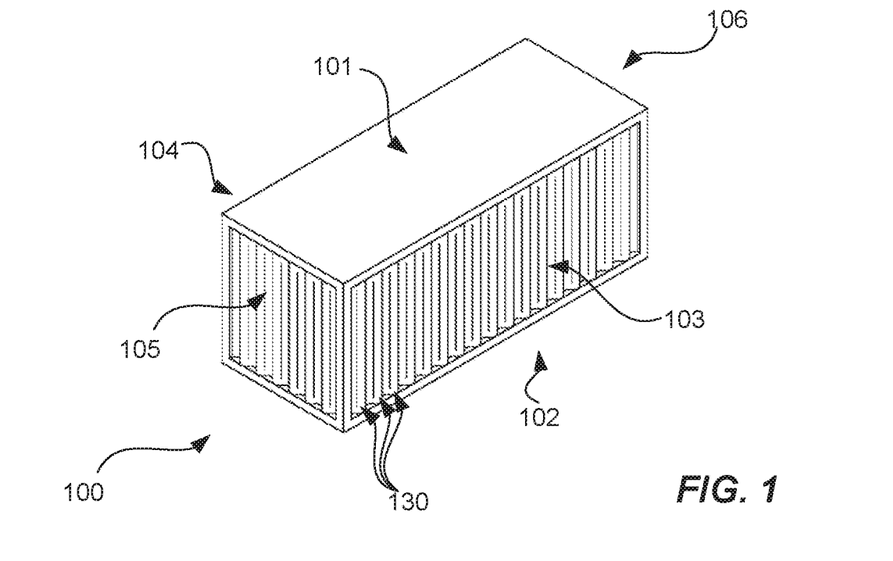
FIG. 1 shows a self-contained, deployable robotic beverage station in an undeployed state according to an embodiment of the subject matter disclosed herein.

FIG. 1 shows a self-contained, deployable robotic beverage station 100 in an undeployed state according to an embodiment of the subject matter disclosed herein. In this embodiment, the beverage station 100 may be characterized as a pre-fabricated, plug-n-play, robotics "coffee franchise in a box" suitable for use such that anyone can become a cafe owner/operator without the risk of stepping through a steep learning curve. The "box" in FIG. 1 resembles a shipping container and is of comparable size when undeployed such that the undeployed beverage station may be moved through conventional means (e.g., a semi-trailer (not shown) suited to move a shipping container).

In FIG. 1, the beverage container comprises a rectangular shape having a top side 101 and a bottom side 102. The beverage station 101 further includes four side walls where one set of side walls 103 and 104 are greater in length that the respective adjacent side walls 105 and 106. The side walls 103-106 of the beverage station 100 may include ribs that provide additional vertical support during transport or during deployment. Further, as will be discussed further below, the side walls 103-106 of the beverage station may also be movably coupled to the top wall and or the bottom wall such that the side walls may be rotated downward to form a platform surrounding the core of the beverage station 100 and/or rotated upward to form a canopy surrounding the core of the beverage station 100. Other shapes of the beverage station 100 are possible but not discussed further herein for brevity.

As will also be discussed further below, the beverage station 100 may be deployed for a plurality of purposes depending on time of day and depending on desired services. That is, in the morning time, the beverage station 100 may be configured to serve coffee drinks and other drinks typically associated with customers' choices in the morning time (e.g., afternoon beverages such as tea, juices, and the like). Likewise, in the afternoon, the beverage station may be reconfigured to serve typical afternoon beverages (e.g., tea, coffee, happy hour drinks. Similarly, the beverage station 100 may be configured to serve evening drinks in the evening time such as wines, beers, and cocktails. This flexible deployment capability may be further automated by having a majority of operations be handled by robotic automation as is discussed below with respect to FIG. 5. Prior to discussing the automated and/or robotic operations of the beverage station 100, the mobile deployment nature of the beverage station 100 is discussed with respect to FIGS. 2-4.

Figure 2:
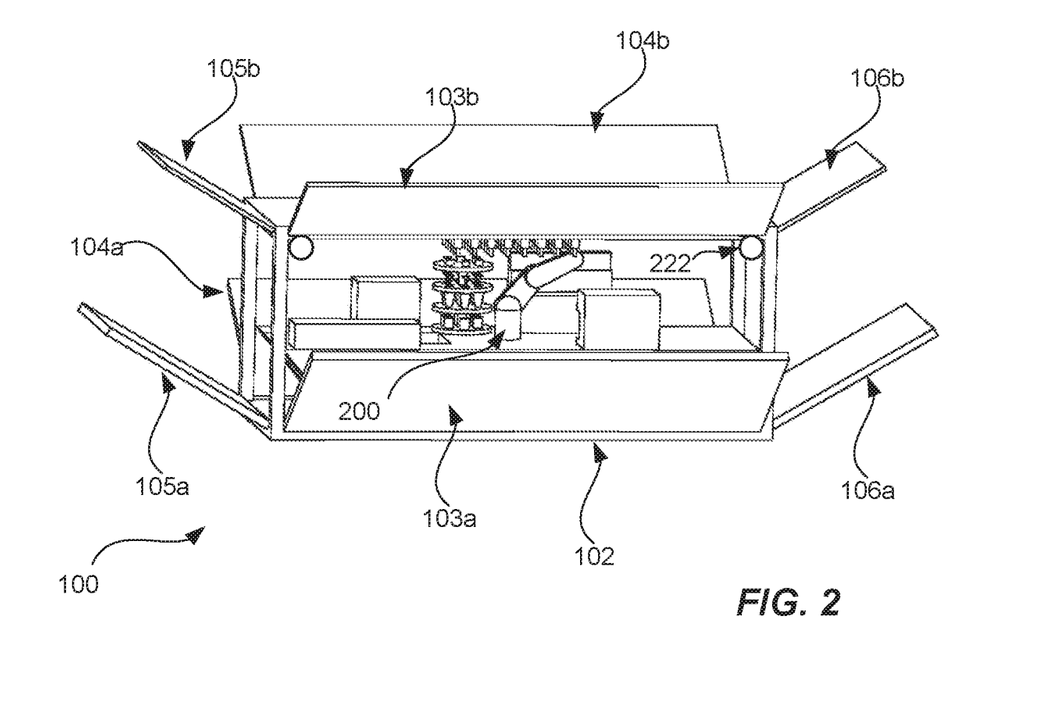
FIG. 2 is a diagram of shows a self-contained, deployable robotic beverage station in a state of being deployed according to an embodiment of the subject matter disclosed herein.

FIG. 2 is a diagram of shows the self-contained, deployable robotic beverage station 100 of FIG. 1 in a state of being deployed according to an embodiment of the subject matter disclosed herein. In FIG. 2, one can see that the walls 103-106 of the container may be maneuvered to reveal the core 200 of automated beverage station 100 inside. Furthermore, the walls 103-106 as shown in FIG. 1 may actually be two separate respective walls at each side. That is, the side wall 103 of FIG. 1 may comprise a first side wall 103a that is rotatably coupled to the bottom side wall 102 and a second wall 103b that is rotatably coupled to the top side wall 101, the side wall 104 may comprise a first side wall 104a that is rotatably coupled to the bottom side wall 102 and a second wall 104b that is rotatably coupled to the top side wall 101, the side wall 105 may comprise a first side wall 105a that is rotatably coupled to the bottom side wall 102 and a second wall 105b that is rotatably coupled to the top side wall 101, and the side wall 106 may comprise a first side wall 106a that is rotatably coupled to the bottom side wall 102 and a second wall 106b that is rotatably coupled to the top side wall 101.

In this manner, the set of side walls 103a-106a that fold out downward and remain attached to the bottom side wall 102 may form a flooring and/or platform that surrounds the beverage station core 200. Likewise, the set of side walls 103b-106b that fold out upward and remain attached to the top side wall 101 may form a ceiling and/or canopy that surrounds the beverage station core 200. Further, each rotating wall 103a-106a and 103b-106b may be actuated by an operator that manually deploys the beverage station 100. Alternatively, each maneuverable wall may be actuated by a respective motor (each motor references as 222 in FIG. 2) via a controller (not shown in FIG. 2 that is disposed in the core 200. The platform and the canopy may be more readily seen in FIG. 3 that shows the beverage station fully deployed.

Figure 3:
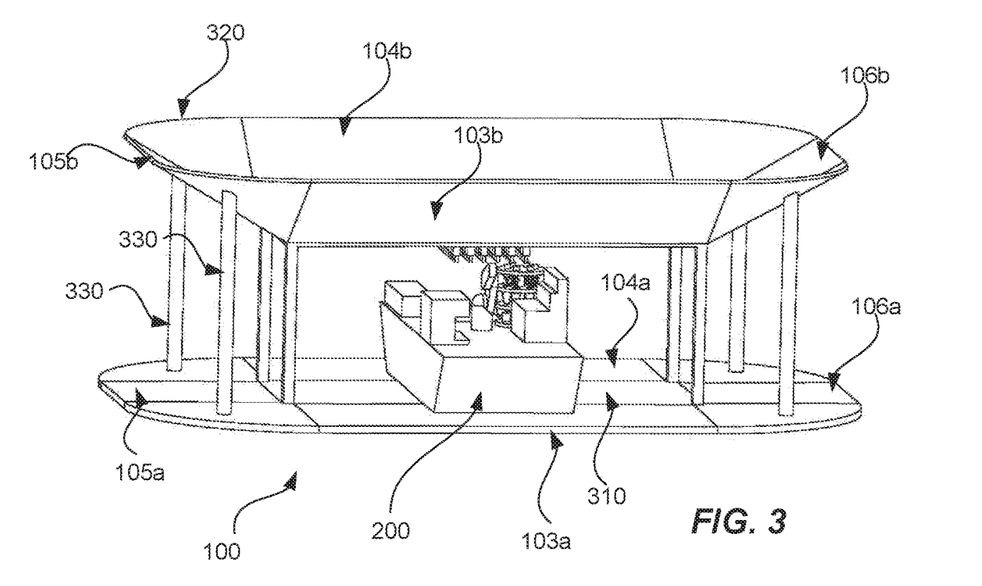
FIG. 3 shows a self-contained, deployable robotic beverage station in state of deployment according to an embodiment of the subject matter disclosed herein.

FIG. 3 shows a self-contained, deployable robotic beverage station 100 in state of full deployment according to an embodiment of the subject matter disclosed herein. In FIG. 3, the beverage station 100 is fully deployed such that the downward folding walls 103a-106a of FIG. 2 are fully deployed to form a surrounding platform 310. Further, the upward folding walls 103b-106b of FIG. 2 are fully deployed to form a surrounding canopy 320. Further yet, one or more supports 330 may be deployed to provide vertical support of the canopy 320 as supported in the platform 310. These vertical supports may be telescoping in nature such that each support in stored within the platform 310 or canopy 320 portion of the walls. Further, the supports 330 may be separately stored within the core 200 of the beverage station 100 when not in a deployed state. Thus, an operator may set the supports 330 during deployment of the maneuverable walls 103a-106a and 103b-106b.

Additional structural features of the deployable walls may be present in various embodiments as well. For example, the platform-forming walls 103a-106a may include attached furniture that, when the walls 103a-106a are deployed become useful for human patrons to sit and enjoy served beverages. Similarly, the platform-forming walls 103a-106a may include attached line management structures such as ropes affixed to posts and arrows or instructions displayed on the flooring portion of the deployed platform. Further yet, the deployed canopy 320 may also include signage for marketing purposes or for instructional purposes as patrons approach the beverage station 100.

Figure 4:
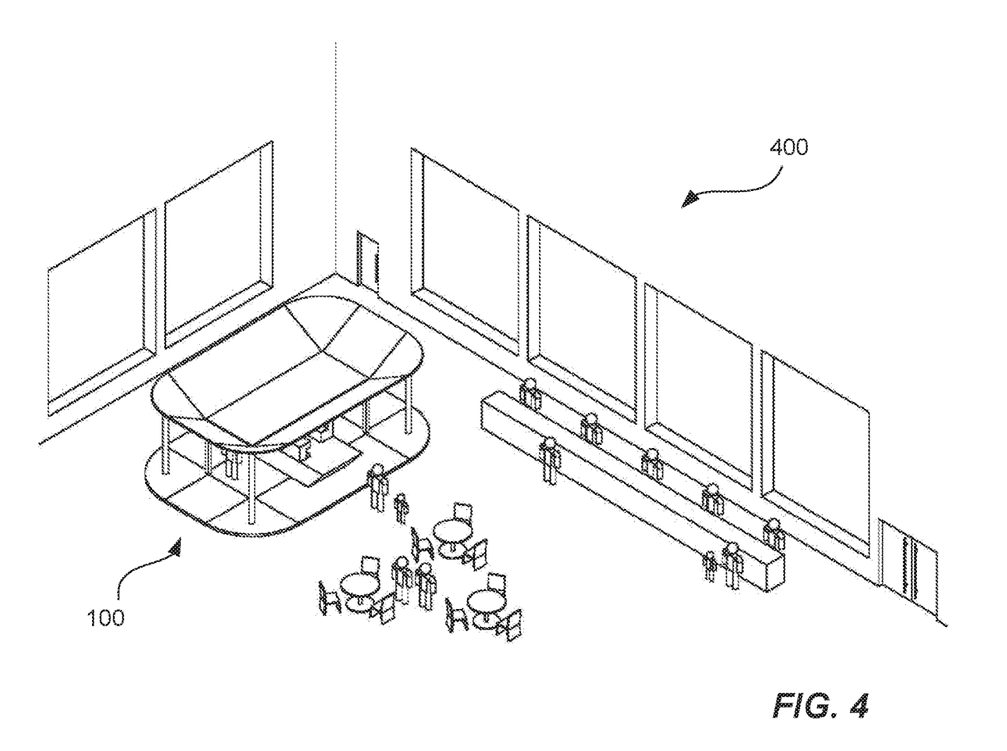
FIG. 4 shows an alternative embodiment of a deployable robotic beverage station in state of deployment at a lobby location in a building according to an embodiment of the subject matter disclosed herein.

FIG. 4 shows an embodiment of a deployable robotic beverage station 100 in state of deployment in a mobile location 400 according to an embodiment of the subject matter disclosed herein. As has been discussed previously, the entire deployable robotic beverage station 100 may be transported like a typical container and deployed within a traditional store, hotel lobby lounge, mall, an office lobby, a pool-side bar, an airport, a co-working space, or a cruise ship. As can be seen in FIG. 4, a suitable building lobby 400 may have ample space for a deployable, self-contained robotic beverage station 100 as shown. In this embodiment, overall aesthetics may be emphasized without the need for rapid recall and redeployment. Such an embodiment may be better suited for a more permanent deployment or deployment for an extended period of time in such a suitable location 400.

Figure 5:
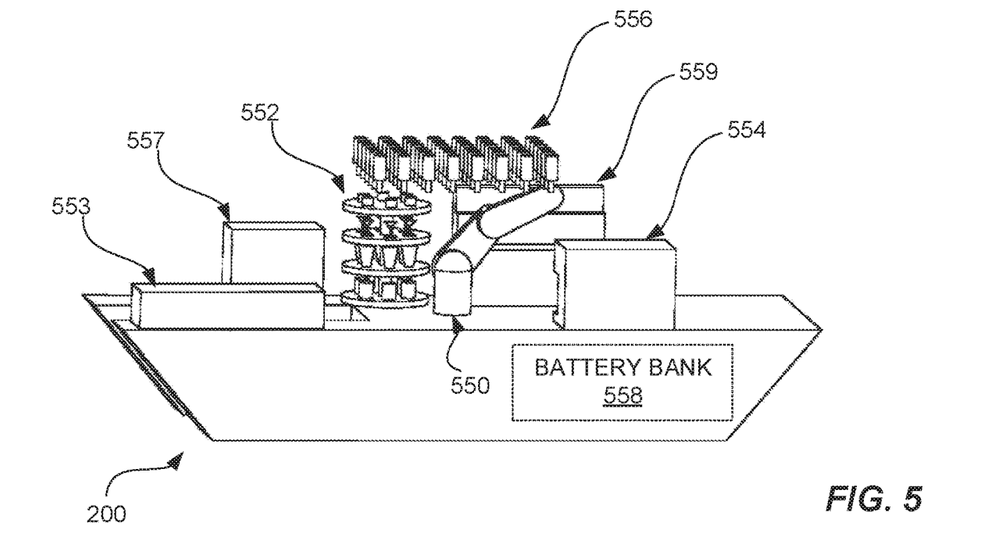
FIG. 5 is a diagram of a robotic-actuated beverage dispensing apparatus suitable for use within the deployable robotic beverage stations of FIG. 1-4 according to an embodiment of the subject matter disclosed herein.

FIG. 5 is a diagram of a robotic-actuated beverage dispensing core 200 that may be suitable for use within the deployable robotic beverage station 100 of FIG. 1-4 according to an embodiment of the subject matter disclosed herein. The beverage=station core 200, as shown in FIG. 5, includes a number of different actuators and components, but a skilled artisan understands that this is but one example of one configuration of a beverage-station core 200. Other configurations are possible with more of fewer actuators and/or components. For the purposes of brevity, the embodiment of FIG. 5 is described herein.

Thus, the beverage-station core 200 includes a main robotic arm 550 that may be programmatically controller by a beverage-station core controller 559 that is communicatively and controllably coupled to the main robotic arm 552. Thus, as beverage orders are processed, the main robotic arm 550 may be controlled to select a beverage container from a beverage container repository 552, dispense beverage ingredients from a beverage ingredients repository 556, impart mixing actions, such as heating cooling, stirring, shakings, straining and the like using a beverage action actuator 554, and then serving a drink at a service counter 553.

As shown in FIG. 5, there is one main robotic arm actuator 552 for accomplishing the afore-mentioned tasks, however, additional secondary actuators may also be present including actuators to impart actions upon a beverage that is being prepared (e.g., shaking, straining, stirring, and the like). Thus, a secondary actuator (not shown) for shaking or stirring may be present and controlled by the core controller 559. Further, an actuator for imparting heat to a beverage or dispensing ice to a beverage may be present and controlled by the core controller 559. Further yet, an actuator for deploying the platform, canopy and/or support structures may be present and controlled by the core controller 559. Still further, come beverage may be disposed in a bottle or can form factor and a dedicated bottle/can dispenser actuator may be present and controlled by the core controller 559. Other possible actuators are contemplated but not discussed further herein for brevity. The beverage station core 200 may also include a battery bank that may supply electric power to all components. The battery bank 558 may be rechargeable when coupled to a permanent power source (e.g., plugged in) such that the overall beverage station core 200 is powered through the battery bank 558 that is coupled to the permanent power source.

The beverage-station core 200 may include a wireless communication module within the core controller 559 that is configured to communicatively coupled to a computer network (e.g., the Internet) such that patrons may use mobile computing devices (e.g., smart phones) to engage an application for ordering and paying for beverages. That is, a patron may utilize an application executing on a mobile phone (or other computing device) to order beverages such that the beverage station 100 then prepares the beverages and presents the prepared beverage to the patron at the beverage serving counter 553. This is shown in greater detail below with respect to FIGS. 6-8. The beverage-station core 200 may also include a local order-taking interface 557 for patrons to walk up and place an order through an interactive touch screen interface. This interface may also include functionality for receiving payment (e.g., credit card, near-field communication (NFC) payment, receiving currency, and the like. Aspects of order-taking procedures are discussed next with respect to FIGS. 6-8.

Figure 6:
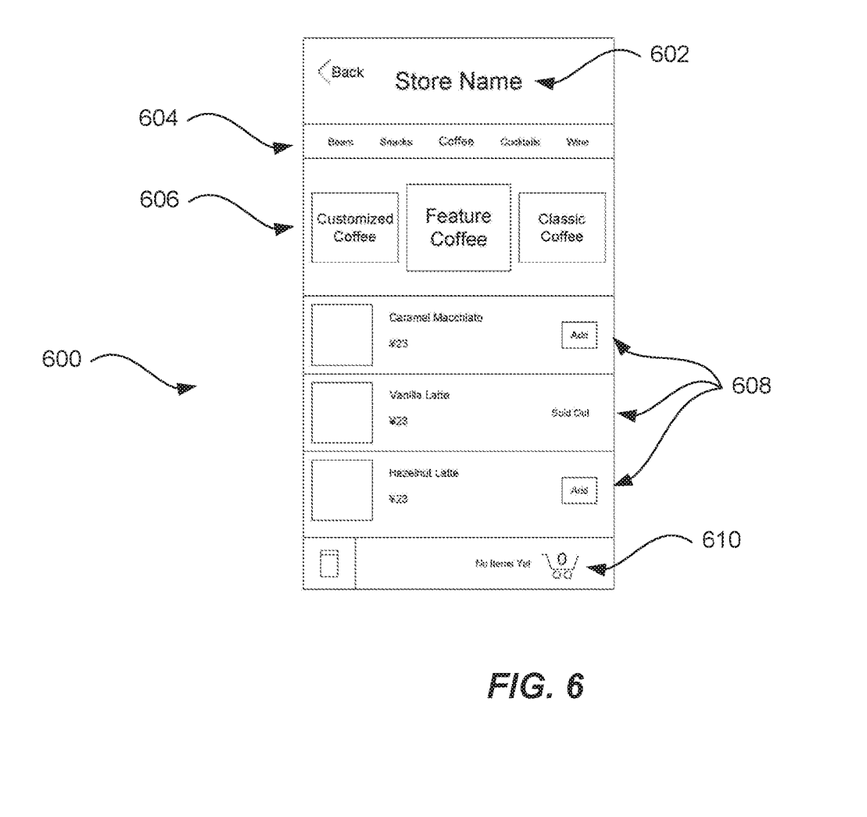
FIG. 6 is a screenshot of an application executing on a computing device for using the deployable robotic beverage stations of FIG. 1-5 according to an embodiment of the subject matter disclosed herein.

FIG. 6 is a screenshot 600 of an application executing on a computing device for using the deployable robotic beverage stations of FIG. 1-5 according to an embodiment of the subject matter disclosed herein. Patrons of the beverage station 100 may use localized computer interfaces (e.g., a tablet attached to a countertop) or their own personized computer interfaces executing a third-party or proprietary application (e.g., a smart phone) to place orders with the automated beverage station. One such application may be an application entitled WeChat, but other embodiments are possible. The application interface allows a high degree of personalization for both coffee and cocktails through this digital ordering platform.

Thus, the screenshot 600 shows branding 602 for a particular store, generally labeled "store name" for the purposes of this disclosure. Further, a primary menu 604 is shown and for any selected primary menu item, a secondary menu 606 may also be presented with additional choices of sub-categories within the primary menu 604 selection. Further yet, specific items 608 for selection within the secondary menu 606 may also be presented in a main window selection field. Any specific selection that is made may be added to a shopping cart feature 610 that is shown at the bottom field of the executing application.

Figure 7:
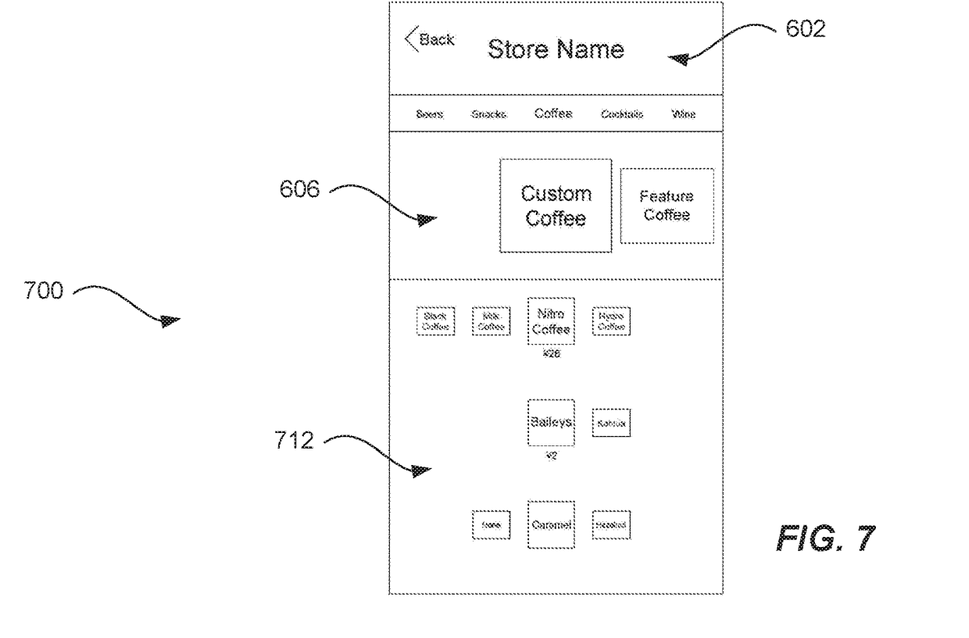
FIG. 7 is an alternative embodiment showing a screenshot of an application executing on a computing device for using the deployable robotic beverage stations of FIG. 1-5 according to an embodiment of the subject matter disclosed herein.

FIG. 7 is an alternative embodiment showing a screenshot 700 of an application executing on a computing device for using the deployable robotic beverage stations of FIG. 1-5 according to an embodiment of the subject matter disclosed herein. In a follow-on screen during a navigation event or browsing session of a patron, additional choices for customizing a drink may be shown in a customization field 712 may be shown while maintain the secondary menu 606 choices as well as store branding 602. In this manner, a patron may customize a drink order prior to effecting payments and consummation of the ordering procedure.

Figure 8:
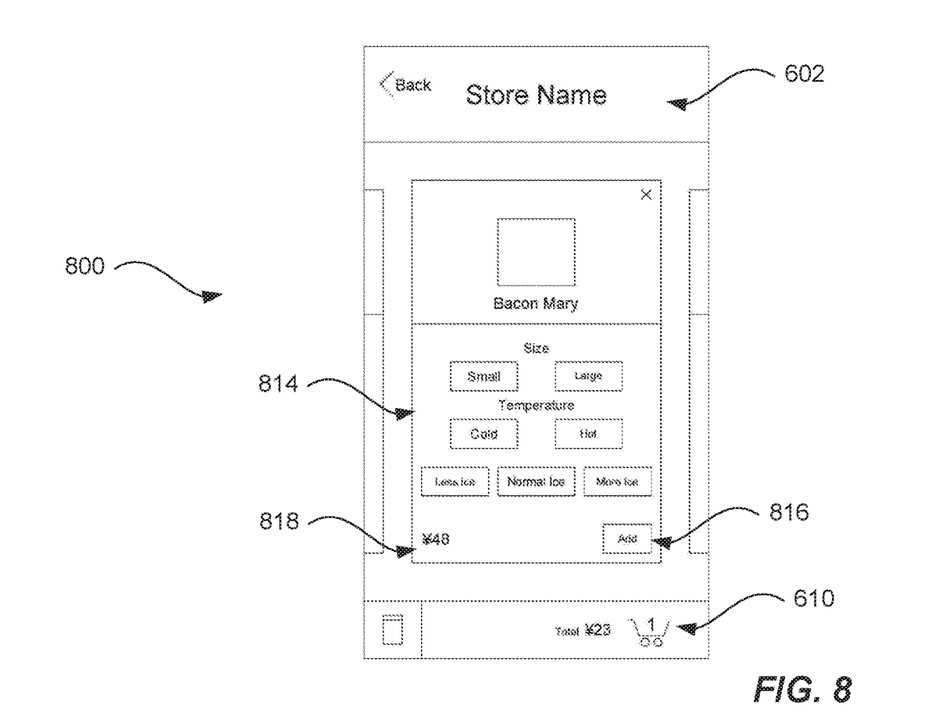
FIG. 8 is another alternative embodiment showing a screenshot of an application executing on a computing device for using the deployable robotic beverage stations of FIG. 1-5 according to an embodiment of the subject matter disclosed herein.

FIG. 8 is another alternative embodiment showing a screenshot 800 of an application executing on a computing device for using the deployable robotic beverage stations of FIG. 1-5 according to an embodiment of the subject matter disclosed herein. In this view, a patron may further customize an order with additional customization choices in a follow-on customization field 814 such as beverage size and beverage temperature. Further, as this may be a final customization page 814, the patron may be presented a total cost 818 of the customized beverage and an enabled action button 816 for adding the customized beverage to the shopping cart 610. As before, store branding 602 is maintained and the shopping cart 610 may updated to show the number of items selected for eventual purchase.

As various societies are trending towards a "cashierless" society, significant market adoption in digital food ordering and payment is becoming prevalent. Thus, links to bank accounts and/or credit cards allow patrons to quickly and easily pay for services and beverages. For example, in China many enterprises have adopted a scan-to-order system, including KFC™ and Pizza Hut™. China's largest pre-order F&B application by KFC™ accomplishes almost 10% of daily transactions through the application. KFC™ stores within special locations such as train stations have exhibited application orders as high as 30% of total transactions. Mobile payment transactions have steadily risen from RMB1 trillion (2012) to RMB20 trillion (2016). The combination of scan-to-order, pre-order, and mobile payments has helped F&B giants like Yum!™ Brands improve customer experience and reduce labor costs.

Figure 9:
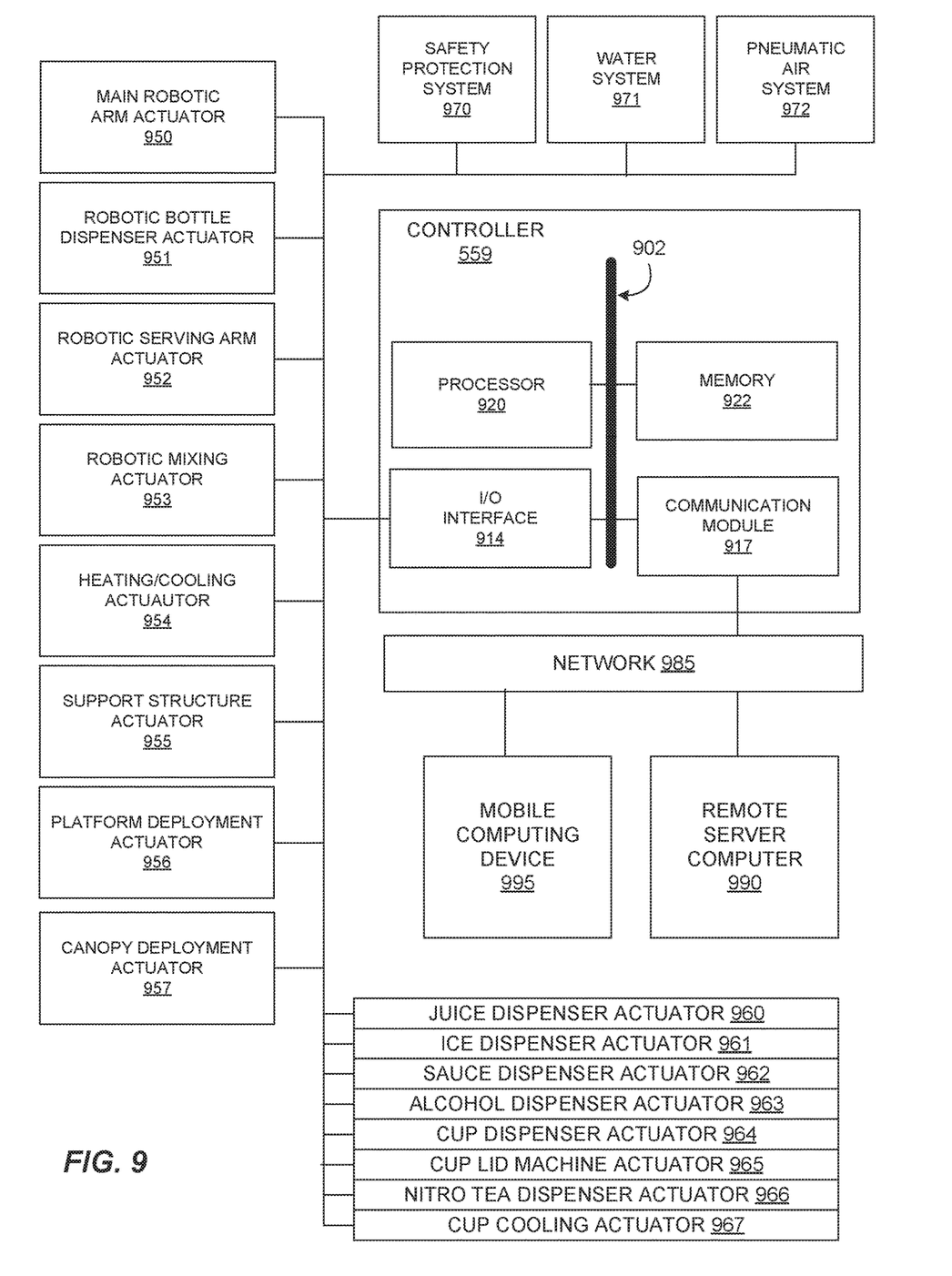
FIG. 9 is a block diagram of a robotic-actuated beverage dispensing apparatus suitable for use within the deployable robotic beverage stations of FIG. 1-5 according to an embodiment of the subject matter disclosed herein.

FIG. 9 is a block diagram 900 of a robotic-actuated beverage dispensing apparatus suitable for use within the deployable robotic beverage stations of FIG. 1-5 according to an embodiment of the subject matter disclosed herein. The block diagram 900 may be a system-based block representation of the overall beverage station as discussed in the previous figures. The primary component that controls and communicates with all other components is the beverage station controller 559 that includes a localized processor 920 for executing computer-readable instructions that may be stored in a local memory 922. The controller may include a localized bus 902 for facilitating communications between the processor and components coupled to the bus 902 such as the memory 922.

The controller 559 may further include a localized communications module that communicates with the processor through the local bus 902. The communications module 917, e.g., a network interface card or module, may be communicatively coupled to a computer network 985, such as and intranet or the Internet. Through typically switched-packet network communication protocol, the controller 559 may communicate with other computing devices such as one or more server computing devices 990 (e.g., a financial-transactions institution) and/or one or more mobile computing device 995 (e.g., a customer's smart phone).

The controller 559 may further include one or more (likely several) input/output (I/O) interfaces 914 that are suited to provide a communications and control interface between the processor that executes computer-readable instructions and various external actuators that impart physical movement based on interpreted computer-readable instructions. The various actuators described herein are done so with brevity as the skilled artisan understands how to program a robotic actuator based on processor 920 control. Thus, the actuators include a main Robotic Arm Actuator 950, a robotic bottle dispenser actuator 951, a robotic serving arm actuator 952, a robotic mixing arm actuator 953, a heating and cooling actuator 954, a support structure actuator 955, a platform actuator 956, a canopy actuator 957, a juice dispenser actuator 960, an ice dispenser actuator 961, a sauce dispenser actuator 962, an alcohol dispenser actuator 963, a cup dispenser actuator 964, a cup lid machine actuator 965, a nitro tea dispenser 966, and a cup cooling actuator 967.

The controller 559 may further include one or more (likely several) input/output (I/O) interfaces 914 that are suited to provide a communications and control interface between the processor that executes computer-readable instructions and various external systems that global operations of the beverage station across several actuators based on interpreted computer-readable instructions. The various systems described herein are done so with brevity as the skilled artisan understands how to program a system controller based on processor 920 control. Thus, the systems include a safety protection system 970, a water system 971, and a pneumatic air system 972.

Figure 10:
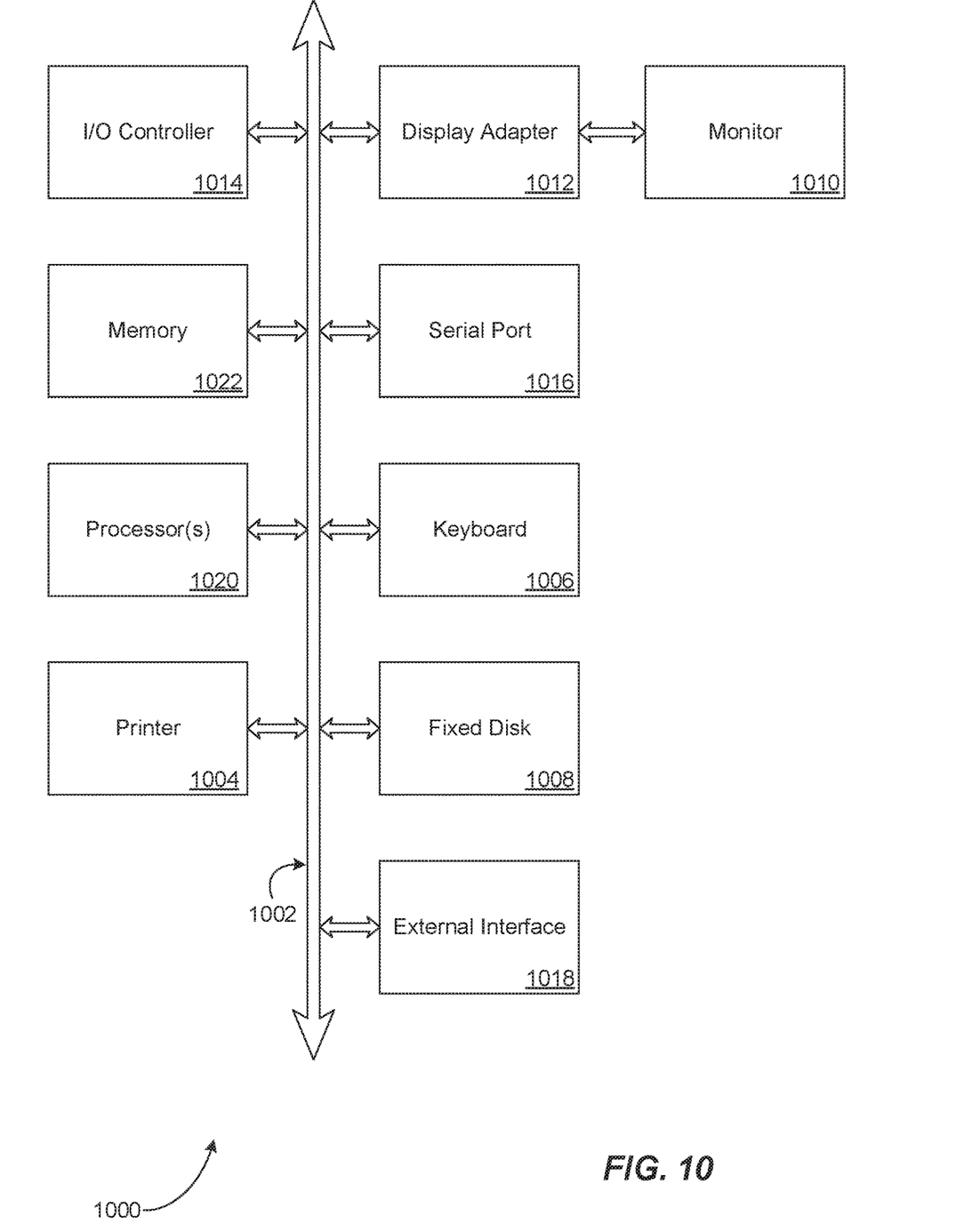
FIG. 10 is a diagram illustrating elements or components that may be present in a computer device or system configured to implement a method, process, function, or operation in accordance with an embodiment of the subject matter disclosed herein.

FIG. 10 and the following discussion are intended to provide a brief, general description of a suitable computing environment in which the subject matter disclosed herein may be implemented. Although not required, aspects of the subject matter disclosed herein will be described in the general context of computer-executable instructions, such as program modules, being executed by a personal computer. Generally, program modules include routines, programs, objects, components, data structures, and the like, that perform particular tasks or implement particular abstract data types. Such program module may be embodied in both a transitory and/or a non-transitory computer readable medium having computer-executable instructions. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that may be linked through a communications network. In a distributed computing environment, program modules may be located in both local and remote memory storage devices.

FIG. 10 is a diagram illustrating elements or components that may be present in a computer device or system 500 configured to implement a method, process, function, or operation in accordance with an embodiment of the information disclosed herein. It may include the system, apparatus, methods, processes, functions, and/or operations for enabling efficient configuration and presentation of a user interface to a user, based on the user's previous behavior, may be wholly or partially implemented in the form of a set of instructions executed by one or more programmed computer processors, such as a central processing unit (CPU) or microprocessor. Such processors may be incorporated in an apparatus, server, client or other computing or data processing device operated by, or in communication with, other components of the system. FIG. 10 illustrates elements or components that may be present in a computer device or system 1000 configured to implement a method, process, function, or operation in accordance with an embodiment. The subsystems shown in FIG. 10 are interconnected via a system bus 1002. Additional subsystems include a printer 1004, a keyboard 1006, a fixed disk 1008, and a monitor 1010, which is coupled to a display adapter 1012. Peripherals and input/output (I/O) devices, which couple to an I/O controller 1014, can be connected to the computer system by any number of means known in the art, such as a serial port 1016. For example, the serial port 1016 or an external interface 1018 can be utilized to connect the computer device 1000 to additional devices and/or systems not shown in FIG. 10, including a wide area network (such as the Internet), a mouse input device, and/or a scanner. The interconnection via the system bus 1002 allows one or more processors 1020 to: communicate with each subsystem, control the execution of instructions that may be stored in a system memory 1022 and/or the fixed disk 1008, and to exchange information between subsystems. The system memory 1022 and/or the fixed disk 1008 may represent any tangible computer-readable medium.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The system may use a bus 1002 that can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The systems and methods herein enable rapid ingestion of big data sets in a distributed computing environment. The metadata driven approach intake processing reduces source ingestion time, enhances reliability, and automates data intake. Furthermore, the platform agnostic nature of the present disclosure can operate on an input source in any electronic format. The error logging and reporting of the present disclosure further enable users to monitor progress and identify bad data based on predetermined or dynamically generated validation tolerances.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g., data, information, metadata, and the like), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, and the like), an "eBook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, and the like) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular 30 link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, and the like, may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®, JAVASCRIPT, active server pages (ASP) common gateway interface scripts (CGI), extensible markup language (XML), dynamic HTML, cascading style sheets (CSS), AJAX (Asynchronous JAVASCRIPT and XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of process flow and the descriptions thereof may make reference to user WINDOWS®, webpages, websites, web forms, prompts, and the like. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", and the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to cat least one of A, B, and C' or cat least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

Since many modifications, variations, and changes in detail can be made to the described preferred embodiments of the subject matter, it is intended that all matters in the foregoing description and shown in the accompanying drawings be interpreted as illustrative and not in a limiting sense. Thus, the scope of the subject matter should be determined by the appended claims and their legal equivalence.

That which is claimed is:

1. A beverage station, comprising:
 a beverage-station base unit having movable walls configured to be deployed to form a platform surrounding the beverage-station base unit when deployed and containing contents of the beverage-station base unit when not deployed in use;

a robotic beverage serving device disposed in the beverage-station base unit having a processor for controlling one or more robotic actuators for making and serving one or more beverages;

an input module communicatively coupled to a computer network and configured to receive one or more orders for one or more beverages from a remote computing device that is also communicatively coupled to the computer network; and an interface coupled to the input module for receiving a beverage order from a patron of the beverage station;

wherein an order received at the interface of the input module causes the robotic beverage serving device to make and serve a beverage corresponding to the one or more orders.

2. The beverage station of claim 1, further comprising a beverage repository having beverages suited for beverages commonly consumed by humans during morning and disposed adjacent to the robotic beverage serving device, the beverage station configured to serve beverages from the morning beverage repository during a specific period of time during a day associated with morning.

3. The self-contained beverage station of claim 2, further comprising a beverage repository having beverages suited for beverages commonly consumed by humans during evening and disposed adjacent to the robotic beverage serving device, the beverage station configured to serve beverages from the evening beverage repository during a specific period of time during a day associated with evening.

4. The beverage station of claim 1, further comprising a secondary robotic actuator configured to select a beverage container from a beverage container repository when preparing a beverage.

5. The beverage station of claim 1, further comprising a rechargeable battery bank configured to supply electric power to the beverage station.

6. The beverage station of claim 1, further comprising human seating and beverage table features affixed to the deployed walls suited for human use when deployed.

7. The beverage station of claim 1, further comprising a second set of deployable walls that are configured to form a canopy when deployed.

8. The beverage station of claim 1, further comprising a secondary robotic actuator configured to impart heating or cooling to a beverage being prepared by the beverage station.

9. A beverage station, comprising:
a beverage-station base unit having movable walls configured to be deployed to form a platform surrounding the beverage-station base unit when deployed and containing contents of the beverage-station base unit when not deployed in use;

a robotic beverage serving device disposed in the beverage-station base unit having a processor for controlling one or more robotic actuators for making and serving one or more beverages; and an input module communicatively coupled to a computer network and configured to receive one or more orders for one or more beverages from a remote computing device that is also communicatively coupled to the computer network;

wherein the robotic beverage serving device comprises a first configuration optimized for use with beverages commonly ordered during morning time and comprises a second configuration for use with beverages commonly ordered during evening time.

10. The beverage station of claim 9, wherein beverages commonly ordered during morning time comprise coffee and tea.

11. The beverage station of claim 9, wherein beverages commonly ordered during evening time comprise mixed alcoholic drinks.

12. The beverage station of claim 9, further comprising an actuator for selecting a beverage container, the actuator for selecting a beverage container communicatively coupled to the processor and configured to be controlled by the processor.

13. The beverage station of claim 9, further comprising an actuator for selecting beverage ingredients, the actuator for selecting beverage ingredients communicatively coupled to the processor and configured to be controlled by the processor.

14. The beverage station of claim 9, further comprising an actuator for shaking the beverage, the actuator for shaking the beverage communicatively coupled to the processor and configured to be controlled by the processor.

15. The beverage station of claim 9, further comprising an actuator for imparting heat to the beverage, the actuator for imparting heat to the beverage communicatively coupled to the processor and configured to be controlled by the processor.

16. The beverage station of claim 9, further comprising an actuator for straining the beverage, the actuator for straining the beverage communicatively coupled to the processor and configured to be controlled by the processor.

17. A system, comprising:
a computer network having one or more computing devices wirelessly communicating through the computer network;

one or more mobile computing device communicatively coupled to the computer network; and a beverage station, including,
a beverage-station base unit having movable walls configured to be deployed to form a platform surrounding the beverage-station base unit when deployed and containing contents of the beverage-station base unit when not deployed in use;

a robotic beverage serving device disposed in the beverage-station base unit having a processor for controlling one or more robotic actuators for making and serving one or more beverages; and an input module communicatively coupled to the computer network and configured to receive one or more orders for one or more beverages from the one or more mobile computing devices; and a server computer communicatively coupled to the computer network and configured to coordinate a financial transaction in response to serving the one or more beverages ordered;

wherein an order received at the input module causes the robotic beverage serving device to make and serve a beverage corresponding to the one or more orders.

18. The system of claim 17, wherein the one or more mobile computing devices further comprises an application executing therein that facilitated customization and purchasing of the one or more beverages ordered.

* * * * *

UNITED STATES PATENT AND TRADEMARK OFFICE
CERTIFICATE OF CORRECTION

| | | |
|---|---|---|
| PATENT NO. | : 11,628,574 B2 | |
| APPLICATION NO. | : 16/434626 | |
| DATED | : April 18, 2023 | |
| INVENTOR(S) | : Gavin Pathross | |

It is certified that error appears in the above-identified patent and that said Letters Patent is hereby corrected as shown below:

On the Title Page

In the Assignee (73):
Please replace "Ross Digital PTD Ltd." with "Ross Digital PTE Ltd.".

Signed and Sealed this
Sixteenth Day of May, 2023

*Katherine Kelly Vidal*

Katherine Kelly Vidal
*Director of the United States Patent and Trademark Office*